United States Patent
Koczera

(10) Patent No.: US 9,555,512 B2
(45) Date of Patent: Jan. 31, 2017

(54) WORK HOLDING DEVICES

(71) Applicant: Richard Koczera, Eaton, OH (US)

(72) Inventor: Richard Koczera, Eaton, OH (US)

( * ) Notice: Subject to any disclaimer, the term of this patent is extended or adjusted under 35 U.S.C. 154(b) by 340 days.

(21) Appl. No.: 14/223,053

(22) Filed: Mar. 24, 2014

(65) Prior Publication Data
US 2014/0189999 A1 Jul. 10, 2014

Related U.S. Application Data

(62) Division of application No. 13/224,827, filed on Sep. 2, 2011, now Pat. No. 8,701,257.

(60) Provisional application No. 61/379,754, filed on Sep. 3, 2010.

(51) Int. Cl.
| | |
|---|---|
| *B23Q 3/06* | (2006.01) |
| *B25B 5/00* | (2006.01) |
| *B25B 5/10* | (2006.01) |
| *B25B 5/14* | (2006.01) |
| *B25B 1/02* | (2006.01) |

(52) U.S. Cl.
CPC . *B23Q 3/06* (2013.01); *B25B 1/02* (2013.01); *B25B 5/003* (2013.01); *B25B 5/10* (2013.01); *B25B 5/147* (2013.01); *Y10T 24/44573* (2015.01); *Y10T 24/44598* (2015.01); *Y10T 29/49998* (2015.01); *Y10T 29/5397* (2015.01); *Y10T 29/53961* (2015.01)

(58) Field of Classification Search
CPC ............ B25B 1/24; B25B 1/2452; B25B 5/02; B25B 11/02
See application file for complete search history.

(56) References Cited

U.S. PATENT DOCUMENTS

| | | |
|---|---|---|
| 893,875 A | 7/1908 | Schneider |
| 2,158,995 A | 5/1939 | Zitzler |
| 2,542,674 A | 2/1951 | Hill |
| 2,671,366 A | 3/1954 | Beusch |
| 3,014,717 A | 12/1961 | Borodin et al. |
| 3,155,384 A | 11/1964 | Schwenzer |
| 3,236,516 A | 2/1966 | Young |
| 3,861,664 A | 1/1975 | Durkee |
| 4,341,375 A | 7/1982 | Romanin |
| 4,736,934 A | 4/1988 | Greech |
| 4,828,240 A | 5/1989 | Longenecker et al. |
| 4,921,378 A | 5/1990 | Kytölä |
| 5,158,487 A | 10/1992 | Varnau |
| D334,202 S | 3/1993 | Hurder |
| 5,207,252 A | 5/1993 | Risse |

(Continued)

*Primary Examiner* — Lee D Wilson
(74) *Attorney, Agent, or Firm* — Dinsmore & Shohl LLP

(57) ABSTRACT

A work holding device that secures a workpiece includes a first support column, a second support column, and a plurality of part fixturing anchors. The first support column and the second support column are coupled to one another forming a longitudinal loading envelope having a width-wise dimension, a height-wise dimension, and a length-wise dimension. At least one of the support columns includes a plurality of part fixturing recesses passing through the support column in the width-wise dimension and arranged within the height-wise dimension and the length-wise dimension of the longitudinal loading envelope. The part fixturing anchors extend through the support column at the part fixturing recesses into the longitudinal loading envelope and couple the workpiece to the first and second support columns.

14 Claims, 10 Drawing Sheets

(56) References Cited

U.S. PATENT DOCUMENTS

| | | |
|---|---|---|
| 5,582,396 A | 12/1996 | Brasca et al. |
| 6,364,302 B2 | 4/2002 | Ausilio |
| 6,439,561 B1 | 8/2002 | Ausilio |
| 6,953,188 B2 * | 10/2005 | Siegel ................. B25B 1/08 |
| | | 269/254 CS |
| 7,007,938 B2 | 3/2006 | Nakata et al. |
| 7,014,180 B1 | 3/2006 | Harrison |
| 7,290,761 B2 | 11/2007 | Siegel |
| 7,293,666 B2 | 11/2007 | Mattlin et al. |
| 7,581,722 B2 * | 9/2009 | Garry ................. B23Q 1/035 |
| | | 269/289 R |
| 7,753,350 B2 | 7/2010 | Barziza |
| 7,922,159 B2 | 4/2011 | Troxler |
| 2005/0103734 A1 | 5/2005 | Saltzberg et al. |
| 2008/0099971 A1 * | 5/2008 | Brown ............... B23Q 1/0063 |
| | | 269/289 R |
| 2009/0283951 A1 | 11/2009 | Rowley |
| 2014/0189999 A1 * | 7/2014 | Koczera ............. B23Q 3/06 |
| | | 29/559 |

\* cited by examiner

WORK HOLDING DEVICES

CROSS-REFERENCE TO RELATED APPLICATIONS

This application is a divisional of U.S. patent application Ser. No. 13/224,827, filed Sep. 2, 2011, titled "Work Holding Devices," which claims priority to and the benefit of U.S. Provisional Application Ser. No. 61/379,754 filed Sep. 3, 2010, titled "Work Holding Device and Method." The instant application is related to co-pending application U.S. Ser. No. 13/224,815, filed Sep. 2, 2011, titled "Part Fixturing Systems Having Expanding Clamping Devices."

BACKGROUND

The present disclosure is generally directed to work holding devices and, more specifically, work holding devices for fixturing workpieces for machining operations.

SUMMARY

Work holding devices allow workpieces to be held for a machining operation. A work holding device is secured to a pallet of a machining center. In general, when a workpiece is inserted into the work holding device, the location of the workpiece within the machining center is programmed into the controller of the machining center, or the operation is "setup." Subsequent operations require an operator of the machining center to re-fixture the workpiece in the multi-axis machining center and/or program the location of the workpiece in the multi-axis machining center.

The inventor has identified that for certain machined parts, decreasing the number of separate operations performed on a single workpiece increases part throughput. Further, as the number of operations decreases, the corresponding number of setups required to machine the part decrease, further increasing throughput and decreasing the likelihood of misalignment due to machining inaccuracies including, but not limited to, tool wear, machine backlash, fixturing inaccuracies, and/or measuring inaccuracies. Embodiments of the present disclosure provide work holding devices that accommodate machining on multiple surfaces of a workpiece without breaking workpiece setup.

In one embodiment, a work holding device that secures a workpiece includes a first support column, a second support column, and a plurality of part fixturing anchors. The first support column and the second support column are coupled to one another forming a longitudinal loading envelope having a width-wise dimension, a height-wise dimension, and a length-wise dimension. At least one of the support columns includes a plurality of part fixturing recesses passing through the support column in the width-wise dimension and arranged within the height-wise dimension and the length-wise dimension of the longitudinal loading envelope. The part fixturing anchors extend through the support column at the part fixturing recesses into the longitudinal loading envelope and couple the workpiece to the first and second support columns.

In another embodiment, a work holding device that secures a workpiece includes a longitudinal loading envelope having a width-wise dimension, a height-wise dimension, and a length-wise dimension. The work holding device also includes a first support column portion at least partially defining the longitudinal loading envelope, and a second support column portion at least partially defining the longitudinal loading envelope. The work holding device further includes a plurality of part fixturing recesses passing through the first support column portion and arranged within the height-wise dimension and the length-wise dimension of the longitudinal loading envelope, and a plurality of part fixturing anchors extending through the first support column portion at the part fixturing recesses into the longitudinal loading envelope. The plurality of part fixturing anchors couple the workpiece to the first support column portion.

In yet another embodiment, a method of manufacturing a component from a workpiece using a work holding device includes securing the work holding device to a pallet of a multi-axis machining center, where the work holding device having a first and a second support column. The method also includes inserting the workpiece into a longitudinal loading envelope formed by the first and second support columns of the work holding device, where a machining portion of the workpiece extends in a length-wise dimension from the longitudinal loading envelope. The method further includes securing a holding portion of the workpiece within a length-wise, width-wise, and height-wise dimension of the longitudinal loading envelope, and machining the machining portion of the workpiece using the multi-axis machining center.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to work holding devices for holding workpieces for machining operations. The work holding devices according to the present disclosure may be used in a variety of machining operations and are easily reconfigurable to accept workpieces of different size and shape for subsequent machining operations. In one embodiment, the work holding device is adapted to be used with a multi-axis horizontal milling center. The work holding device includes a first support column and a second support column coupled to one another. The first and second support columns define a longitudinal loading envelope along the inside of the support columns. A plurality of part fixturing anchors extend through at least one of the support columns and into the longitudinal loading envelope, and couple the workpiece to the support columns. A machining portion of the workpiece extends outside of the longitudinal loading envelope to be machined by the milling center, while a holding portion of the workpiece remains inside the longitudinal loading envelope.

Figure 1:
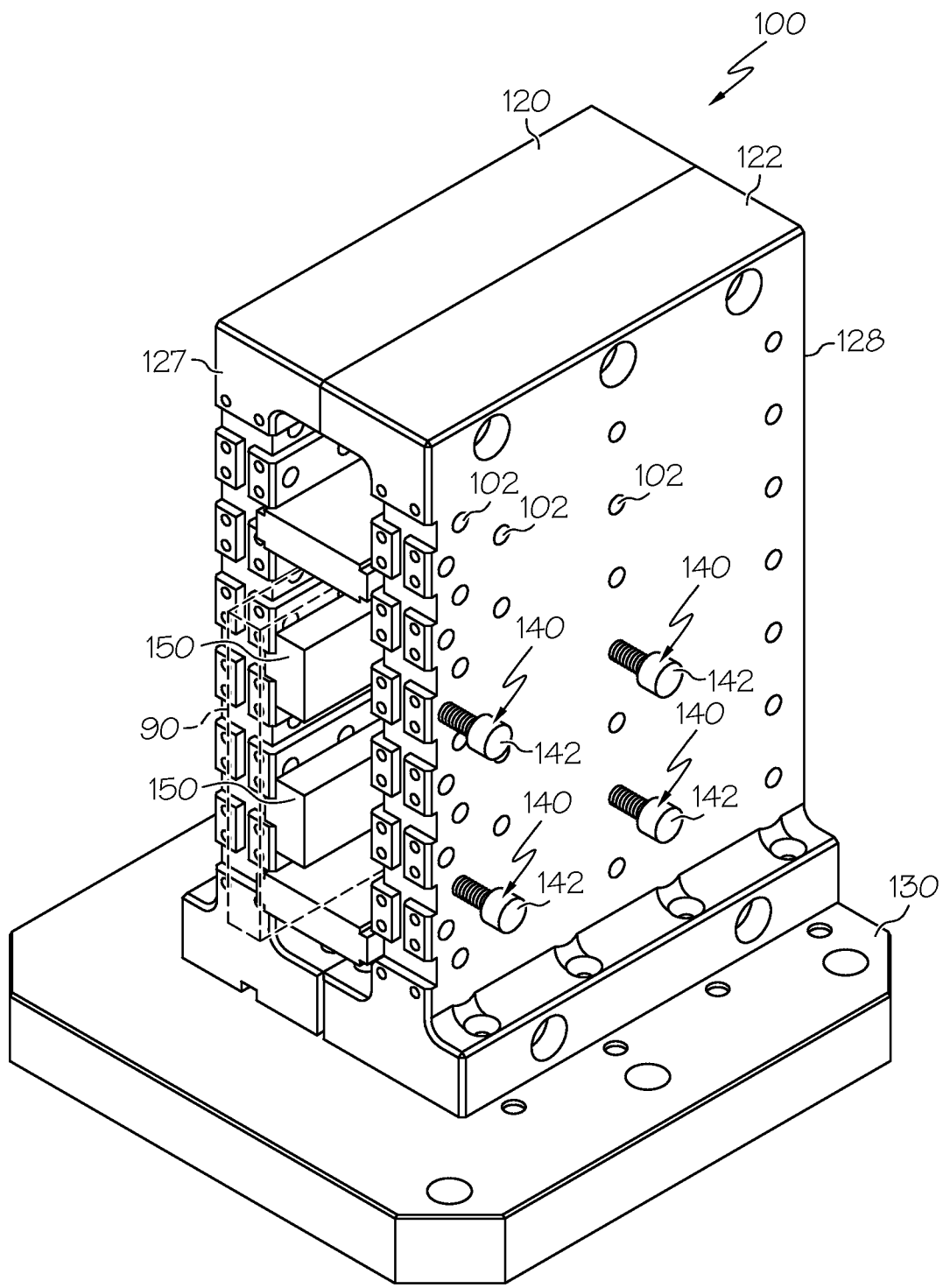
FIG. 1 depicts a front perspective view of a work holding device according to one or more embodiments shown and described herein.

One embodiment of a work holding device 100 is depicted in FIG. 1. The work holding device 100 includes a first support column 120 and a second support column 122. The first and second support columns 120, 122 are coupled to one another and to a base plate 130. The spacing between the first and second support columns 120, 122, form a longitudinal loading envelope, as will be discussed in greater detail below. A workpiece 90 (shown as a dashed line) is inserted into the longitudinal loading envelope and secured by a plurality of part fixturing anchors 140 that extend through at least one of the first or second support columns 120, 122. A portion of the workpiece 90 extends beyond the first and second support columns 120, 122, and is positioned for a machining operation.

Figure 2:
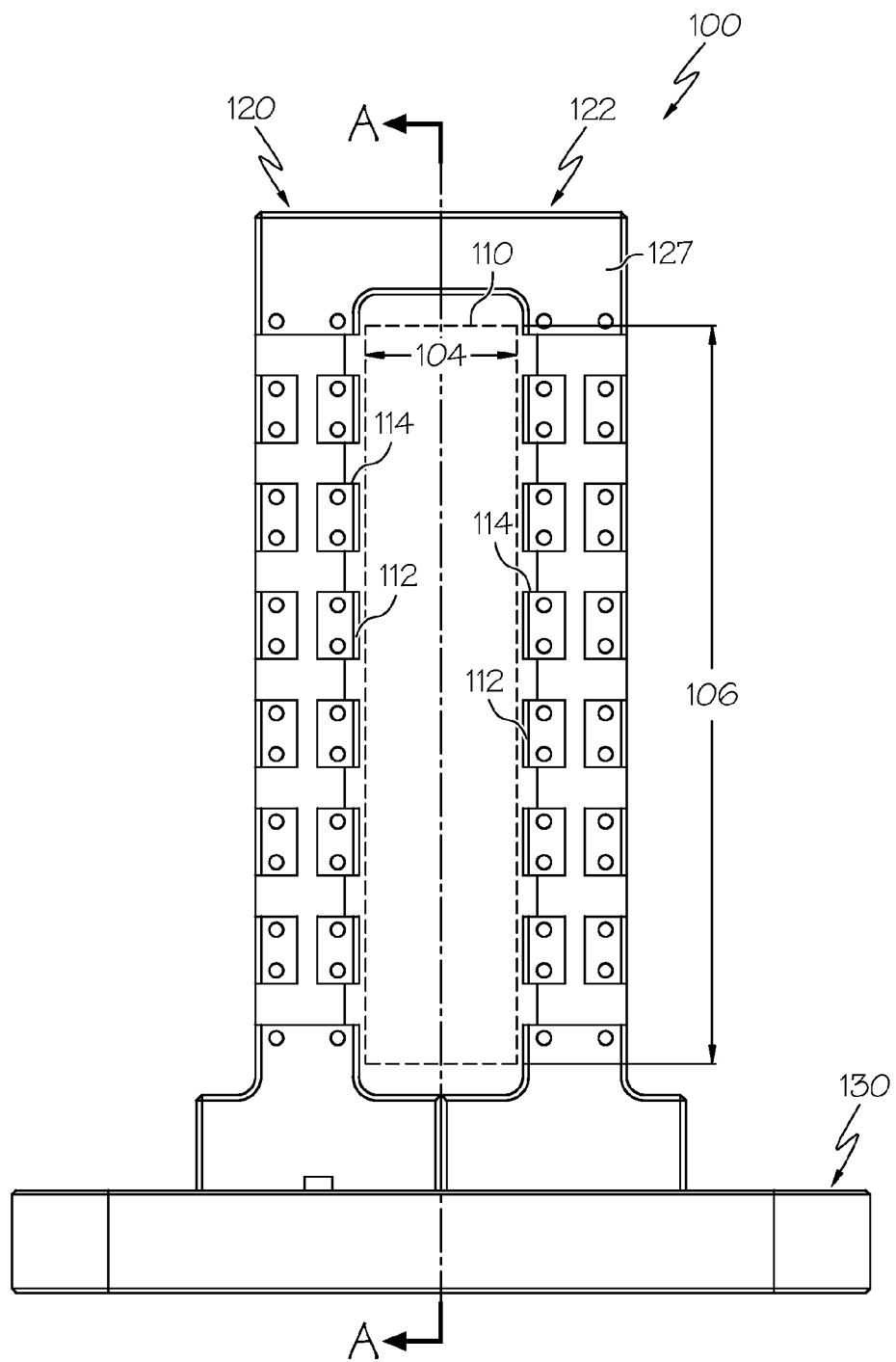
FIG. 2 depicts a front view of a work holding device according to one or more embodiments shown and described herein.
Figure 3:
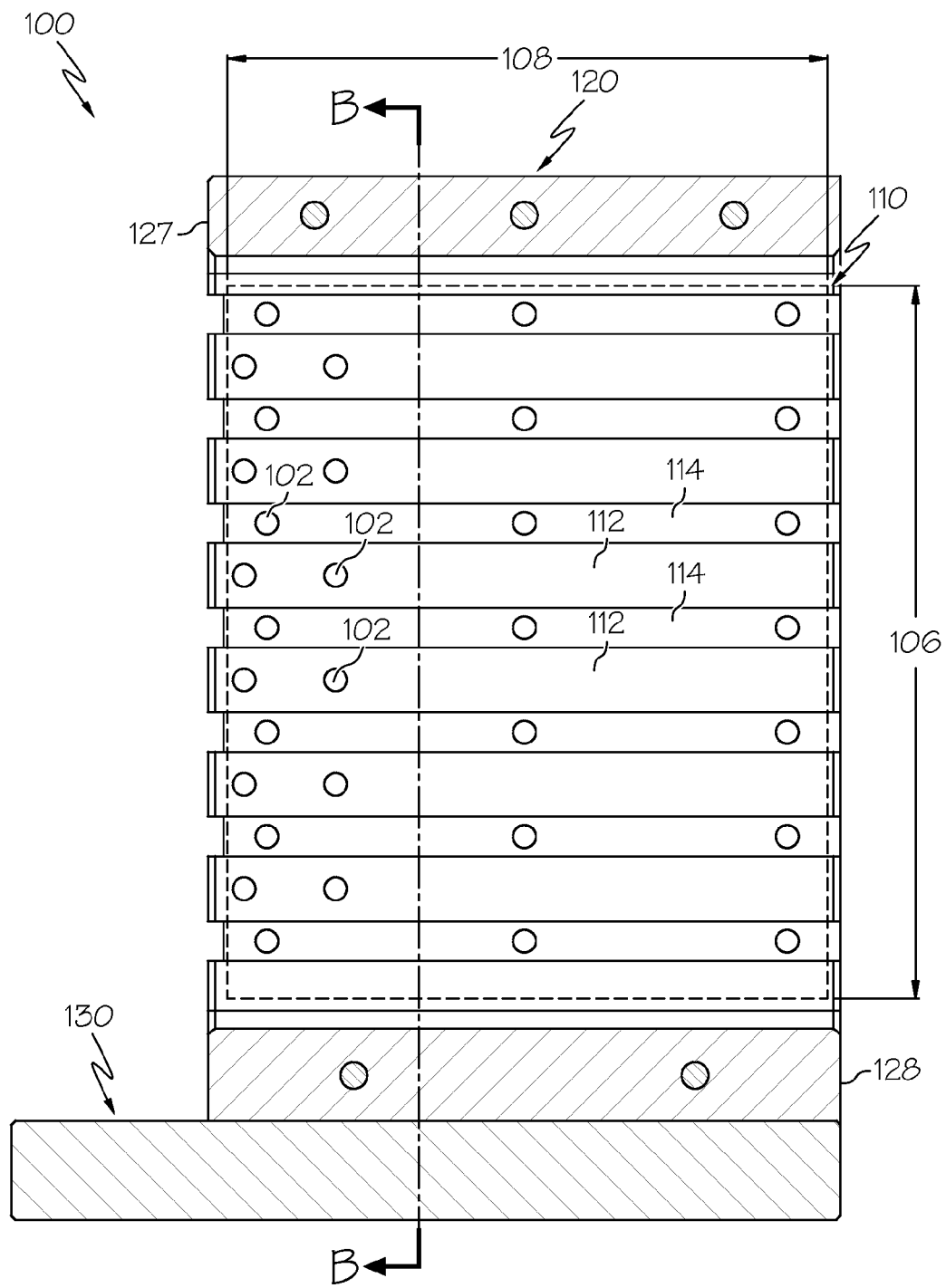
FIG. 3 depicts a sectional right-side view of the work holding device of FIG. 2 shown along line A-A.

The longitudinal loading envelope 110 is shown in greater detail in FIGS. 2 and 3. The longitudinal loading envelope 110 represents the largest-sized cubic-shaped material stock that can be secured for a machining operation by the work holding device 100. The longitudinal loading envelope 110 extends a width-wise dimension 104 from an inside face 112 of the first support column 120 to an inside face 112 of the second support column 122, as illustrated in FIG. 2. The longitudinal loading envelope 110 extends a height-wise dimension 106 between the upper and lower portions of the first and second support columns 120, 122, as illustrated in FIGS. 2 and 3. The longitudinal loading envelope 110 extends a length-wise dimension 108 from the forward face 127 to the rear face 128 of the first and second support columns 120, 122 as illustrated in FIG. 3.

The work holding device 100 includes a plurality of longitudinal channels 114 that extend along the inside of the first and second support columns 120, 122 in the length-wise dimension 108. The longitudinal channels 114 are positioned along the first and second support columns 120, 122 such that the longitudinal channels 114 are located outside of the width-wise dimension 104 of the longitudinal loading envelope 110.

The work holding device 100 also includes a plurality of part fixturing recesses 102 that pass through one or more of the first or second support columns 120, 122. As illustrated in FIG. 3, the part fixturing recesses 102 pass through the first support column 120 and are oriented in the width-wise dimension 104 (see FIG. 2). The plurality of part fixturing recesses 102 are arranged along the first and second support columns 120, 122 such that the part fixturing recesses 102 are located within the height-wise dimension 106 and the width-wise dimension 104 the longitudinal loading envelope 110. The part fixturing recesses 102 may be arranged such that the part fixturing recesses 102 pass through the longitudinal channels 114 of the first and second support columns 120, 122. The part fixturing recesses 102 may be arranged such that the part fixturing recesses 102 do not pass through the longitudinal channels 114 of the first and second support columns 120, 122, and instead pass through the inside face 112 of the support columns 120, 122.

Figure 4:
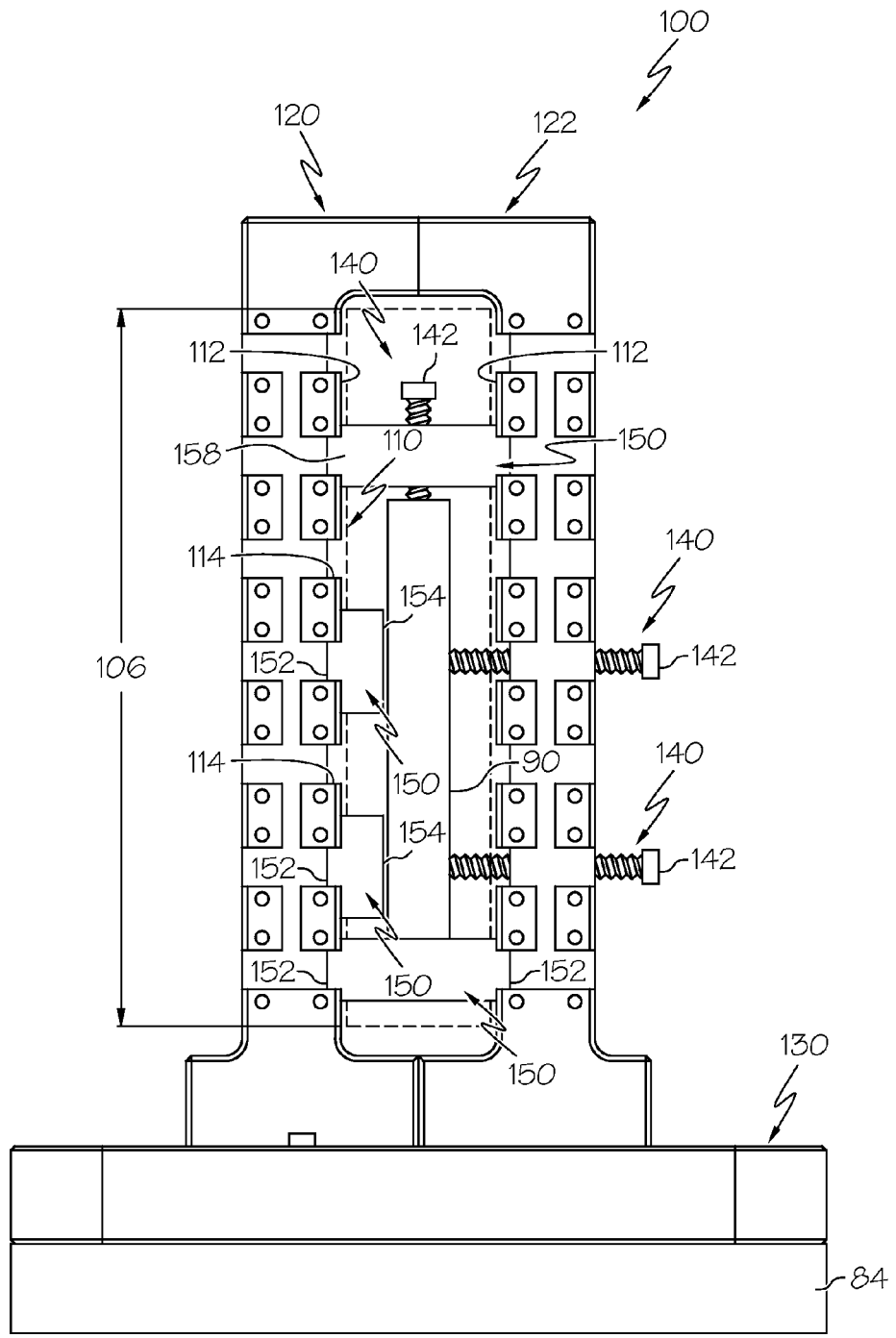
FIG. 4 depicts a front view of a work holding device according to one or more embodiments shown and described herein.

The work holding device 100 further includes a plurality of part fixturing anchors 140 that extend through at least one of the first or second support columns 120, 122 at the part fixturing recesses 102, as illustrated in FIG. 4. The part fixturing anchors 140 apply a retention force to the workpiece 90, such that the part fixturing anchors 140 couple the workpiece 90 to both the first and the second support columns 120, 122. The part fixturing anchors 140 extend a distance into the longitudinal loading envelope 110 that is adjustable to couple workpieces 90 having a variety of sizes and/or shapes to the first and second support columns 120, 122.

In one embodiment of the work holding device 100 illustrated in FIG. 4, the part fixturing anchors 140 include threaded fasteners 142. The threaded fasteners 142 engage with threaded part fixturing recesses 102. The threaded fasteners 142 allow an operator to manually adjust the distance the part fixturing anchors 140 extend into the longitudinal loading envelope 110 to apply a retention force to the workpiece 90.

Figure 8:
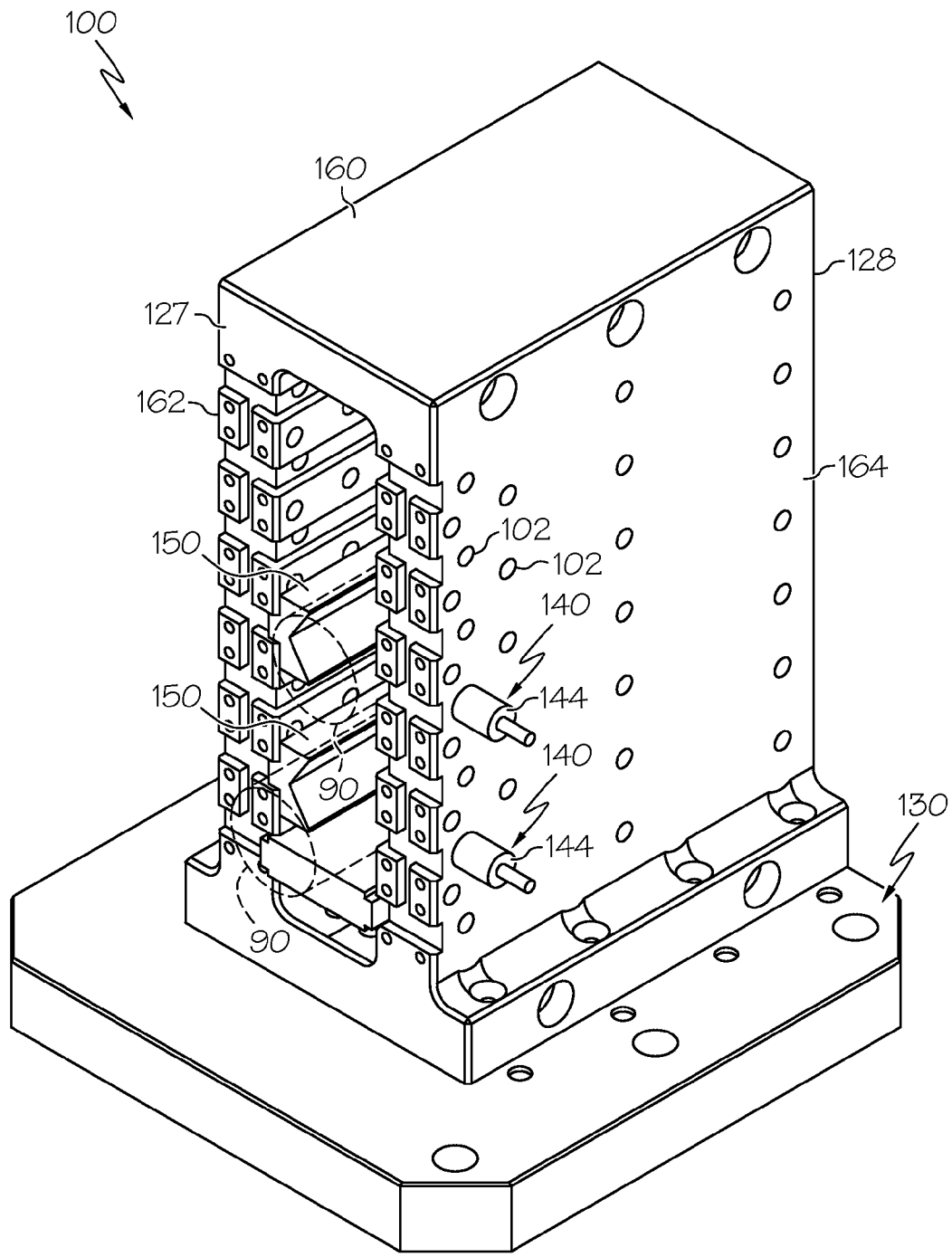
FIG. 8 depicts a front perspective view of a work holding device according to one or more embodiments shown and described herein.
Figure 9:
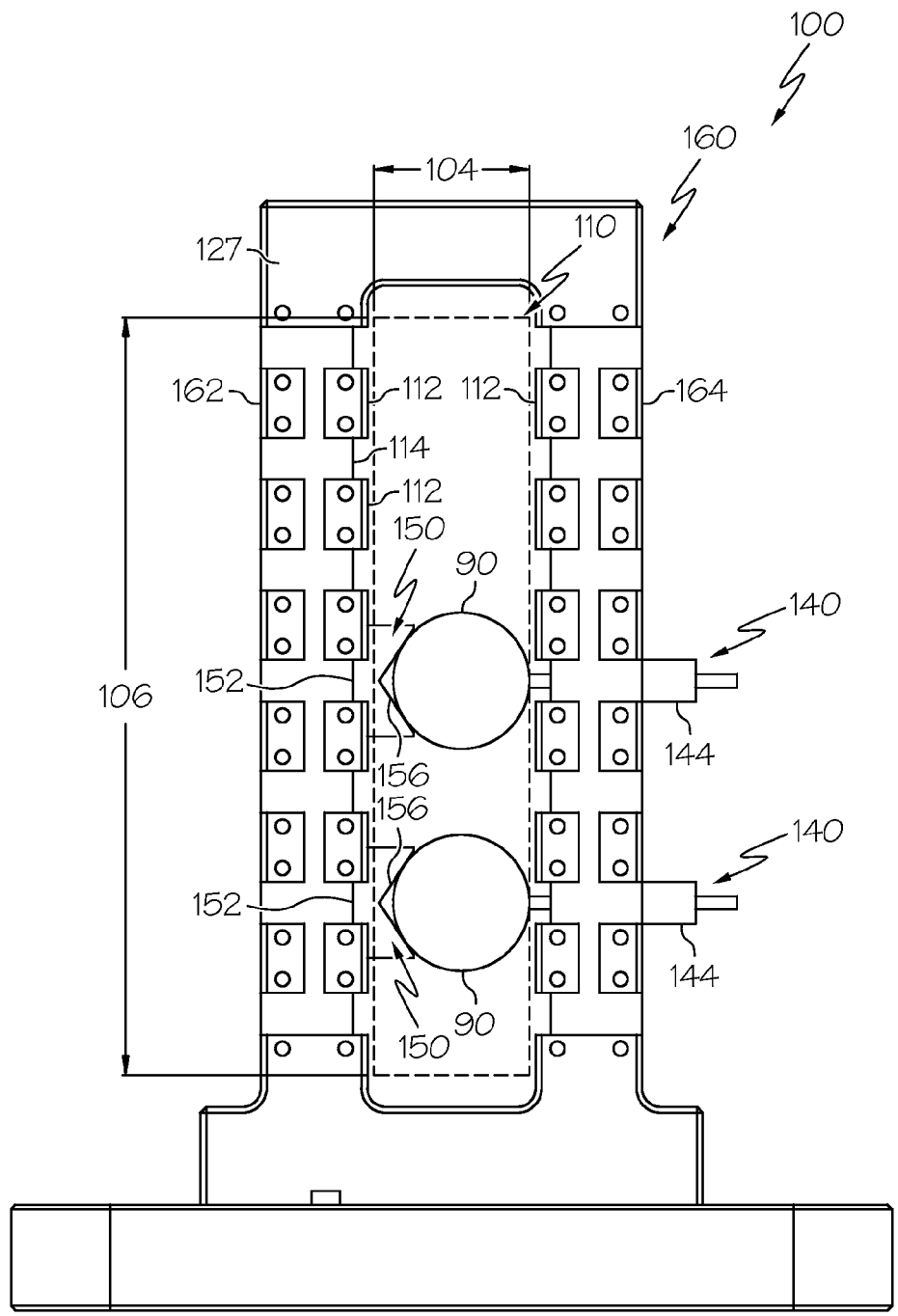
FIG. 9 depicts a front view of a work holding device according to one or more embodiments shown and described herein.

In another embodiment of the work holding device 100 illustrated in FIGS. 8 and 9, the part fixturing anchors 140 include hydraulically-actuated clamps 144. The hydraulically-actuated clamps 144 use a hydraulic fluid at an elevated pressure to extend to contact the workpiece 90 and to apply a retention force to the workpiece 90 to secure the workpiece 90 within the longitudinal loading envelope 110 of the work holding device 100. Hydraulically-actuated clamps 144 allow an operator to control the retention force that is applied to the workpiece 90 by managing the pressure of the hydraulic fluid that is used to manipulate the hydraulically-actuated clamps 144.

As depicted in FIG. 4, the work holding device 100 may also include part support brackets 150 that space the workpiece 90 away from the first and/or second support column 120, 122. The part support brackets 150 include a key portion 152 that extends away from a planar part contact portion 154. The key portion 152 of the part support bracket 150 is inserted into one of the longitudinal channels 114 that extend along the longitudinal loading envelope 110.

As depicted in FIG. 4, some embodiments of the part support brackets 150 include a planar part contact portion 154 that is approximately parallel and offset from the inside face 112 of the first and/or second support columns 120, 122. Part support brackets 150 that include a planar part contact portion 154 are generally used to secure workpieces 90 having planar surfaces, for example, workpieces 90 having a generally cuboid shape. As depicted in FIG. 9, other embodiments of the part support brackets 150 include a faceted part contact portion 156 that are angled to the inside face 112 of the first and/or second support columns 120, 122. Part support brackets 150 that include a faceted part contact portion 156 are generally used to secure workpieces 90 having round surfaces, for example, workpieces 90 having a generally cylindrical shape.

Referring again to FIG. 4, some embodiments of the part support brackets 150 include capping brackets 158 that extend across the width-wise dimension 104 of the longitudinal loading envelope 110. The capping brackets 158 provide support to the workpieces 90 in the height-wise dimension 106. The capping brackets 158 may accomodate a part fixturing anchor 140 that applies a retention force to the workpiece 90 in the height-wise dimension 106. The capping brackets 158 segregate the longitudinal loading envelope 110 into envelope portions having discrete heights that are smaller than height-wise dimension 106 of the longitudinal loading envelope 110.

Figure 5:
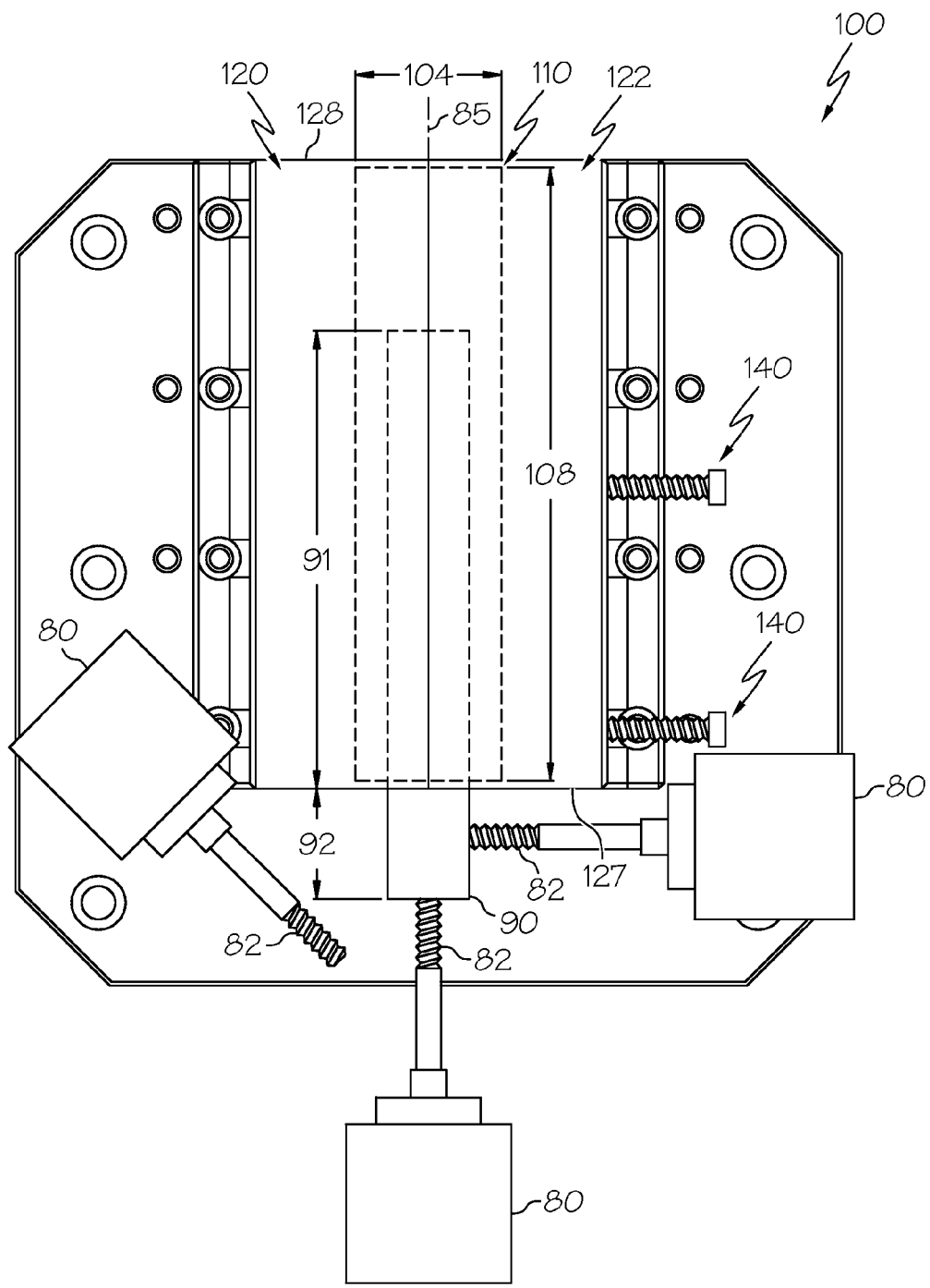
FIG. 5 depicts a top view of a work holding device interacting with a mill spindle in a variety of positions according to one or more embodiments shown and described herein.

Referring now to FIGS. 4 and 5, the work holding device 100 is illustrated as installed in a machining center, for example a 4-axis horizontal milling center having a spindle 80 and a pallet 84. The workpiece 90 is secured by the work holding device 100 by a plurality of part fixturing anchors 140 that apply a retention force to the workpiece 90 that couples the workpiece 90 to the first and second support columns 120, 122. The workpiece 90 is secured such that a holding portion 91 of the workpiece 90 is located inside the longitudinal loading envelope 110, while a machining portion 92 of the workpiece 90 extends from the forward face 127 of the first and second support columns 120, 122. As depicted in FIGS. 4 and 5, the holding portion 91 of the workpiece 90 is smaller than the longitudinal loading envelope 110 in the width-wise dimension 104, the height-wise dimension 106, and the length-wise dimension 108.

The machining portion 92 of the workpiece 90 extends beyond the first and second support columns 120, 122 of the work holding device 100, and is positioned within the machining center for access by a cutter 82 within the spindle 80. Because the work holding device 100 positions the workpiece 90 near a centerline 85 of the pallet 84, as the pallet 84 rotates between indexed rotation orientations, the spindle 80 can position the cutter 82 at the workpiece 90 for a machining operation. Work holding devices 100 according to the present disclosure allow the spindle 80 to position the cutter 82 for a machining operation on the workpiece 90 while the centerline 85 of the pallet 84 is rotated at least approximately 90 degrees away from the spindle 80. Thus, the cutter 82 can perform a machining operation on the workpiece 90 that extends in the length-wise dimension 108 out of the longitudinal loading envelope 110 with the cutter 82 oriented in either the width-wise direction 104 or in the length-wise direction of the longitudinal loading envelope 110. In some embodiments, the spindle 80 may position the cutter 82 for a machining operation while the centerline 85 of the pallet 84 is rotated at least approximately 135 degrees away from the spindle 80.

Work holding devices 100 according to the present disclosure allow a multi-axis machining center to perform machining operations on the workpiece 90 along different surfaces of the workpiece 90 and in different orientations without requiring the workpiece 90 to be removed from the longitudinal loading envelope 110. In some instances, a 4-axis horizontal milling center can machine at least 5 faces of a generally-cuboid (i.e., 6-sided) part. By allowing multiple machining operations to be performed without breaking the workpiece 90 setup within the work holding device 100, greater dimensional accuracy of a finished part may be achieved as compared with other machining processes that require removal and refixturing of a workpiece 90 as subsequent machining operations are performed.

Figure 6:
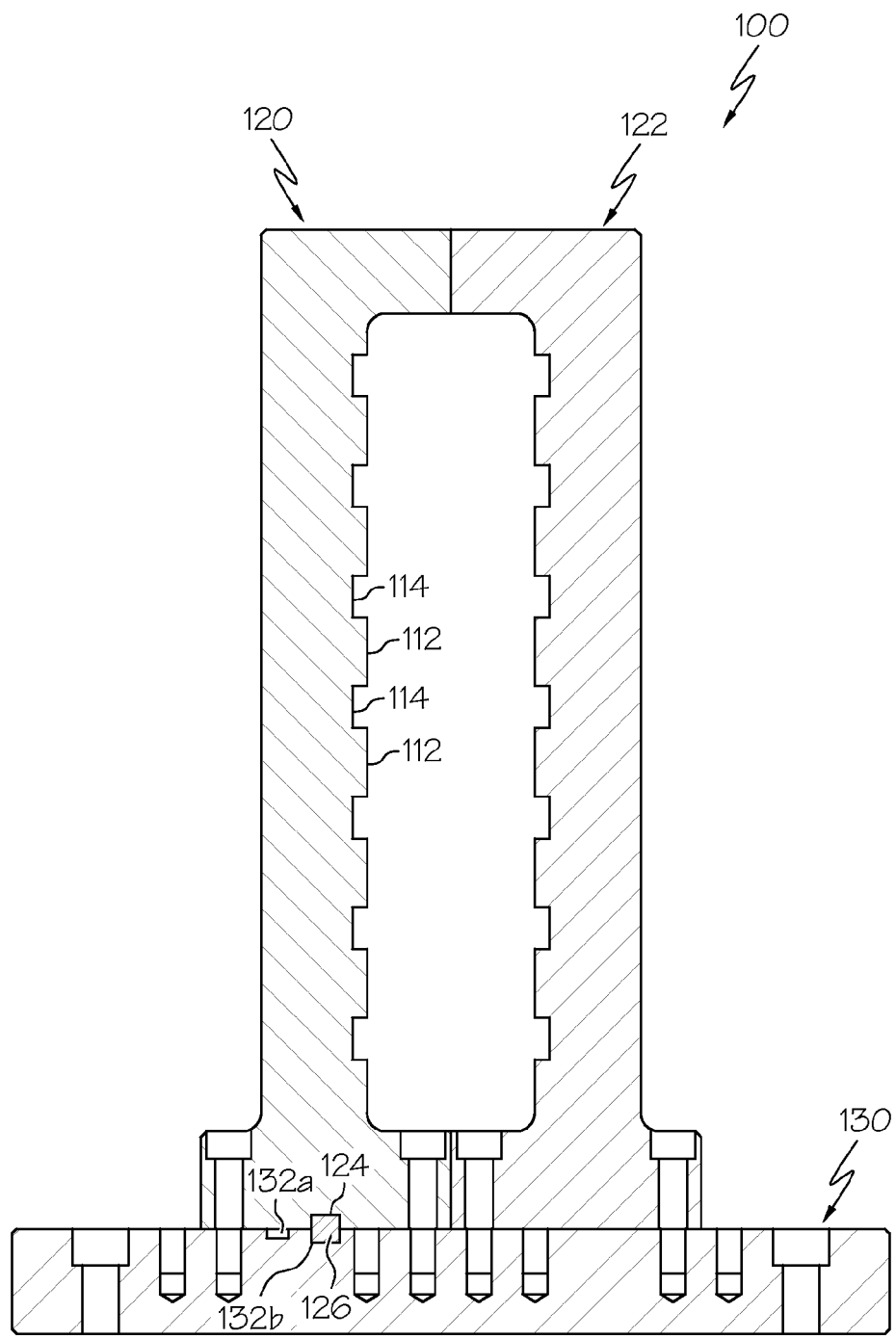
FIG. 6 depicts a sectional front view of the work holding device of FIG. 3 shown along line B-B.
Figure 7:
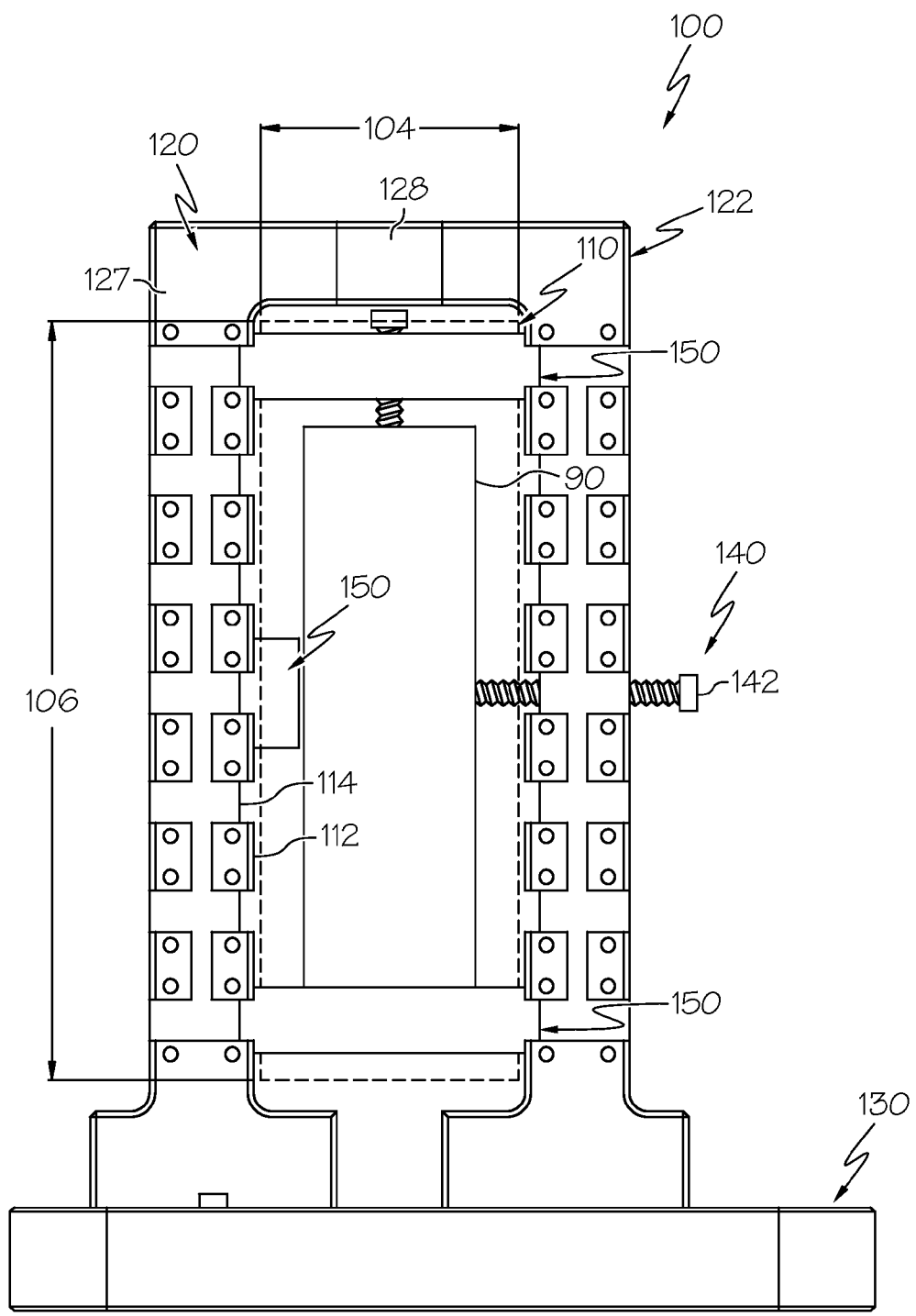
FIG. 7 depicts a front view of a work holding device according to one or more embodiments shown and described herein.

Another embodiment of the work holding device 100 is depicted in FIGS. 6 and 7. In this embodiment, the base plate 130 includes a plurality of longitudinal base plate keyways 132a, 132b. At least one of the first support column 120 or the second support column 122 includes a longitudinal support column keyway 124. The first or second support column 120, 122 is positioned along the base plate 130 such that the longitudinal support column keyway 124 is aligned with one of the plurality of longitudinal base plate keyways 132a, 132b. A key 126 is inserted into the keyslot formed by the longitudinal support column keyway 124 and one of the longitudinal base plate keyways 132a, 132b, and the support columns 120, 122 is secured to the base plate 130. The plurality of longitudinal base plate keyways 132a, 132b allow the support columns 120, 122 to be positioned in a corresponding number of column indexed positions. The width-wise dimension 104 of the longitudinal loading envelope 110 will vary between a corresponding number of indexed width-wise dimensions 104. A upper support stringer 128 that extends in the length-wise dimension 108 of the longitudinal loading envelope 110 is installed between the first and second support columns 120, 122. Further, part support brackets 150 are provided in appropriate sizes to be installed between the first and second support columns 120, 122 with the support columns 120, 122 located in the column indexed positions. Thus, the plurality of longitudinal base plate keyways 132a, 132b allow the first and second support columns 120, 122 to be spaced apart from one another to accommodate workpieces 90 having a variety of width-wise dimension 104 thicknesses.

Another embodiment of the work holding device 100 is depicted in FIGS. 8 and 9. In this embodiment, the work holding devices 100 includes a support column 160 that includes a first support column portion 162 and a second support column portion 164. The first and second support column portions 162, 164 at least partially define the longitudinal loading envelope 110 having a width-wise dimension 104, a height-wise dimension 106, and a length-wise dimension 108, as discussed above in regard to FIGS. 2 and 3. Further, the work holding device 100 includes a plurality of part fixturing recesses 102 that pass through at least one of the first or the second support column portions 162, 164, and are arranged within the height-wise and length-wise dimension 108 of the longitudinal loading envelope 110. The work holding device 100 also includes a plurality of part fixturing devices that extend through one or more of the first or second support column portions 162, 164 into the longitudinal loading envelope 110 to couple a workpiece 90 to the first and/or second support column portions 162, 164. In this embodiment, the width-wise dimension 104 of the longitudinal loading envelope 110 is fixed.

While the embodiment of the work holding device 100 depicted in FIGS. 8 and 9 includes part support brackets 150 having faceted part contact portions 156 and part fixturing anchors 140 that are hydraulically-actuated clamps 144, it is contemplated that any of the embodiments of the part support brackets 150 and the part fixturing anchors 140 may be used with any of the embodiments of the work holding device 100.

Figure 10:
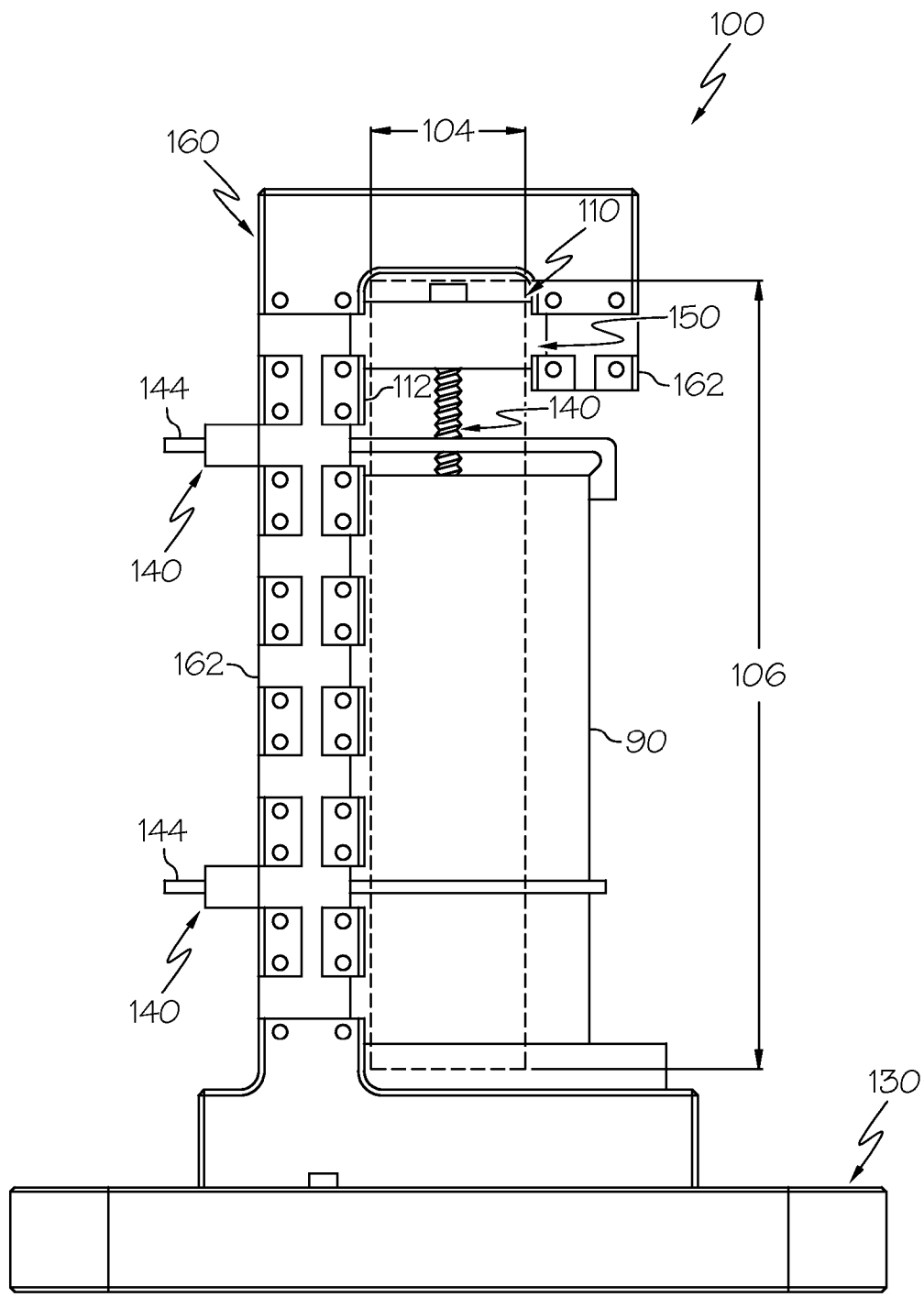
FIG. 10 depicts a front view of a work holding device according to one or more embodiments shown and described herein.

Another embodiment of the work holding device 100 is depicted in FIG. 10. In this embodiment, the support column 160 includes a first support column portion 162 and a second support column portion 164. The second support column portion 164 extends a portion of the height-wise dimension 106 of the longitudinal loading envelope 110. The part fixturing anchors 140 in this embodiment apply a retention force to the workpiece 90 in a direction that biases the workpiece 90 towards the first columns support portion 162, such that the workpiece 90 is coupled to the first support column portion 162. Work holding devices 100 according to this embodiment allow for a machining center to access a portion of the workpiece 90 that is located within the height-wise dimension 106 and the length-wise dimension 108 of the longitudinal loading envelope 110.

Work holding devices 100 according to the present disclosure may be made from a variety of materials including, but not limited to, metals or polymers. Appropriate metals may include aluminum or alloys thereof, steel alloys, or cast iron. In one embodiment, the work holding device 100 may be made from a 6000-series aluminum alloy. Appropriate polymers may include epoxy, nylon, polycarbonate, which may be reinforced with an appropriate reinforcements, which may include include glass or carbon. In one embodiment, the work holding device 100 may be made a reinforce polymer composite that includes epoxy that is reinforced with chopped carbon fibers. The density of the chopped carbon fibers and the epoxy may be varied depending on the strength requirements of the work holding device 100. In yet another embodiment, the work holding device 100 may be made from a reinforced polymer composite that includes nanoparticulates, for example carbon nanotubes, in a polymer matrix. The work holding device 100 may be surface treated to prevent corrosion and/or increase durability of external surfaces.

It should now be understood that work holding devices according to the present disclosure allow for workpieces to be secured within a longitudinal loading envelop, and coupled to the work holding device. The work holding device is reconfigurable to allow workpieces having various sizes and shapes to be accommodated for fixturing in machining operations. The workpieces extend from the longitudinal loading envelope to provide a machining center with multiple sides of the workpieces, which increases the number of faces of the workpiece that can be machining without removing the workpiece from the work holding device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A work holding device that secures a workpiece, the work holding device comprising a first support column, a second support column, a part support bracket, and a plurality of part fixturing anchors, wherein:
   the first support column and the second support column are coupled to one another forming a longitudinal loading envelope comprising a width-wise dimension, a height-wise dimension, and a length-wise dimension defined by a plurality of inside faces of the first and second support columns;
   at least one of the first support column or the second support column comprise a longitudinal channel extending along one of the plurality of inside faces of the first and second support columns in the length-wise dimension of the longitudinal loading envelope;
   the part support bracket comprises a key portion that extends in the length-wise dimension of the longitudinal loading envelope, wherein the key portion is positioned in the longitudinal channel;
   at least one of the first or second support columns comprise a plurality of part fixturing recesses passing through the respective support column in the width-wise dimension and arranged within the height-wise dimension and the length-wise dimension of the longitudinal loading envelope; and
   the part fixturing anchors extend through the support column at the part fixturing recesses into the longitudinal loading envelope and couple the workpiece to the first and second support columns.

2. The work holding device of claim 1, wherein the width-wise dimension of the longitudinal loading envelope is fixed.

3. The work holding device of claim 1, further comprising a base plate, wherein the first support column and the second support column are coupled to the base plate.

4. The work holding device of claim 3, further comprising a key, wherein:
   the base plate comprises a plurality of longitudinal base plate keyways;
   at least one of the support columns comprise a longitudinal support column keyway;
   the key is located within the longitudinal support column keyway and one of the longitudinal base plate keyways; and
   the support columns are coupled the base plate in one of a plurality of column indexed positions such that the longitudinal loading envelope has a plurality of indexed width-wise dimensions.

5. The work holding device of claim 1, further comprising an upper support stringer extending in the length-wise dimension of the longitudinal loading envelope and located between and coupled to the support columns.

6. The work holding device of claim 1, wherein a distance the part fixturing anchors extend into the longitudinal loading envelope is adjustable.

7. The work holding device of claim 1, wherein the part fixturing anchor comprises a threaded fastener.

8. The work holding device of claim 1, wherein the part fixturing anchors comprise a hydraulically-actuated clamp.

9. The work holding device of claim 1, wherein the plurality of part fixturing recesses pass through the support column at the longitudinal channel.

10. The work holding device of claim 1, wherein the part support bracket extends across the width-wise dimension of the longitudinal loading envelope and is seated in both the first and the second support columns, the part support bracket comprising a part contact portion that is orthogonal to the inside face of the support column.

11. The work holding device of claim 1, wherein the part support bracket further comprises a planar part contact portion that is parallel and offset from the inside face of the support column.

12. The work holding device of claim 1, wherein the part support bracket further comprises a faceted part contact portion.

13. The work holding device of claim 1, wherein a portion of the workpiece held by the work holding device extends outside of the longitudinal loading envelope in the length-wise and width-wise dimensions.

14. The work holding device of claim 1, wherein a portion of the workpiece held by the work holding device inside the longitudinal loading envelope is smaller than the longitudinal loading envelope in the width-wise, height-wise, and length-wise dimensions.

\* \* \* \* \*